Dec. 2, 1969 W. B. LOZIER, JR., ET AL 3,482,210

CHARACTER RECOGNITION SYSTEM USING A PLURALITY OF DELAYED SCANS FOR DETERMINING CHARACTER FEATURES

Filed Feb. 12, 1965 5 Sheets-Sheet 1

INVENTORS
WILLIAM B. LOZIER, JR
JOSEPH D. LUCIANI
BY Paul M. Bronner
AGENT

United States Patent Office 3,482,210

Patented Dec. 2, 1969

3,482,210

CHARACTER RECOGNITION SYSTEM USING A PLURALITY OF DELAYED SCANS FOR DETERMINING CHARACTER FEATURES

William B. Lozier, Jr., Vestal, and Joseph D. Luciani, Apalachin, N.Y., assignors to International Business Machines Corporation, Armonk, N.Y., a corporation of New York Filed Feb. 12, 1965, Ser. No. 432,254

Int. Cl. G06k *9/00*

U.S. Cl. 340—146.3 4 Claims

ABSTRACT OF THE DISCLOSURE

A character recognition system in which adjacent scans are paired and stored in a storage means synchronized with the scanning mechanism, to provide by delayed read out, equivalent scans spaced apart by a distance substantially equal to one-half of the character width. Lengths of the equivalent scans are determined by left and right data counters to provide vertical character features. Horizontal locations of character data are determined by counting the number of scans following the beginning of a character. Features are not accumulated until minimum character requirements are detected, showing that the scanning information actually refers to portions of a character. Various counts are selectively employed for character analysis in accordance with the font to be recognized.

The present invention relates to character recognition systems, and particularly to an improved character recognition system employing a minimum amount of apparatus for recognizing characters by virtue of character features.

Character features, as herein considered, may be defined as the presence or absence of one or more portions of a character within predetermined areas and, when considered in combination, provide unique combinations which are indicative of the character itself.

Previously, character recognition systems have required elaborate analyzing means for determining the character to be recognized by the system. Known feature recognition systems usually analyze relatively large numbers of features and require complicated measurements of features, all of which increases the amount of apparatus required.

Accordingly, it is an object of this invention to provide a character recognition system utilizing a character feature recognition technique which is simple and economical in its structure.

Another object of this invention is to provide an improved character recognition system in which feature recognition is obtained using a relatively small number of features.

Another object of this invention is to provide an improved character recognition system in which feature recognition is obtained using features which are relatively simple to discern.

A further object of this invention is to provide an improved character recognition system utilizing apparatus for effectively generating an imaginary rectangular coordinate matrix as a basis for determining character features to be detected.

Still another object of this invention is to provide an improved character recognition system in which the onset of a character initiates an analyzing operation for determining features of the character using both horizontal and vertical zones.

Briefly described, the present invention contemplates scanning a character serially by a plurality of successive vertical scans, which, after digitalization and reduction, provide a plurality of character presence bits which are stored in sequence in serial storage means, such as a magnetic drum. The serial storage means is arranged to store the scan bits from two sets of adjacent scans, and to provide for reading out the scan bits at times which are spaced the time equivalent of scanning one half of a character. Thus, there is made available, for recognition purposes, scanning information from pairs of adjacent scans, spaced apart by appropriately one-half the width of the character to be recognized. The first pair of scans is further consolidated and referred to as an equivalent left scan or "Y" scan, and the second or delayed pair of scans is consolidated and referred to as an equivalent right scan, referred to as "Z."

When it has been established that the scanning information actually represents portions of a character, as represented by a predetermined minimum amount of scan data, designated as MCR (Minimum Character Requirement), the features of the character are retained thereafter, until a signal which indicates the end of a character, at which time the retained character features are decoded to indicate the character scanned.

The presence of character data in the equivalent Y and Z scans is accumulated in binary counters designated as Left (Y) and right (Z) data counters, respectively. Predetermined counts indicate particular character features, and are designated as occurring in the lower, center or upper portion of a character, as determined by a 3-stage ring which is advanced by character data at the center of the character. The presence or absence of character data for different settings of the ring provides vertical character information.

Horizontal locations of character data are provided by determining the right, center and left portions of the character as determined by counting the number of scans following the beginning of a character, and assigning count values to the different horizontal portions of the character. Presence of character data during these predetermined count values indicates the horizontal disposition of character data.

Features determined as described above are stored in temporary storage devices and, when the end of a character is signaled, the character feature information is supplied to combinatorial logic circuits which decode the character features to indicate the character which was scanned. The character information may then be stored for further decoding and/or supplying to a utilization device, such as a data card punch, for example.

The foregoing and other objects, features and advantages of the invention will be apparent from the following more particular description of a preferred embodiment of the invention, as illustrated in the accompanying drawings:

Figure 1:
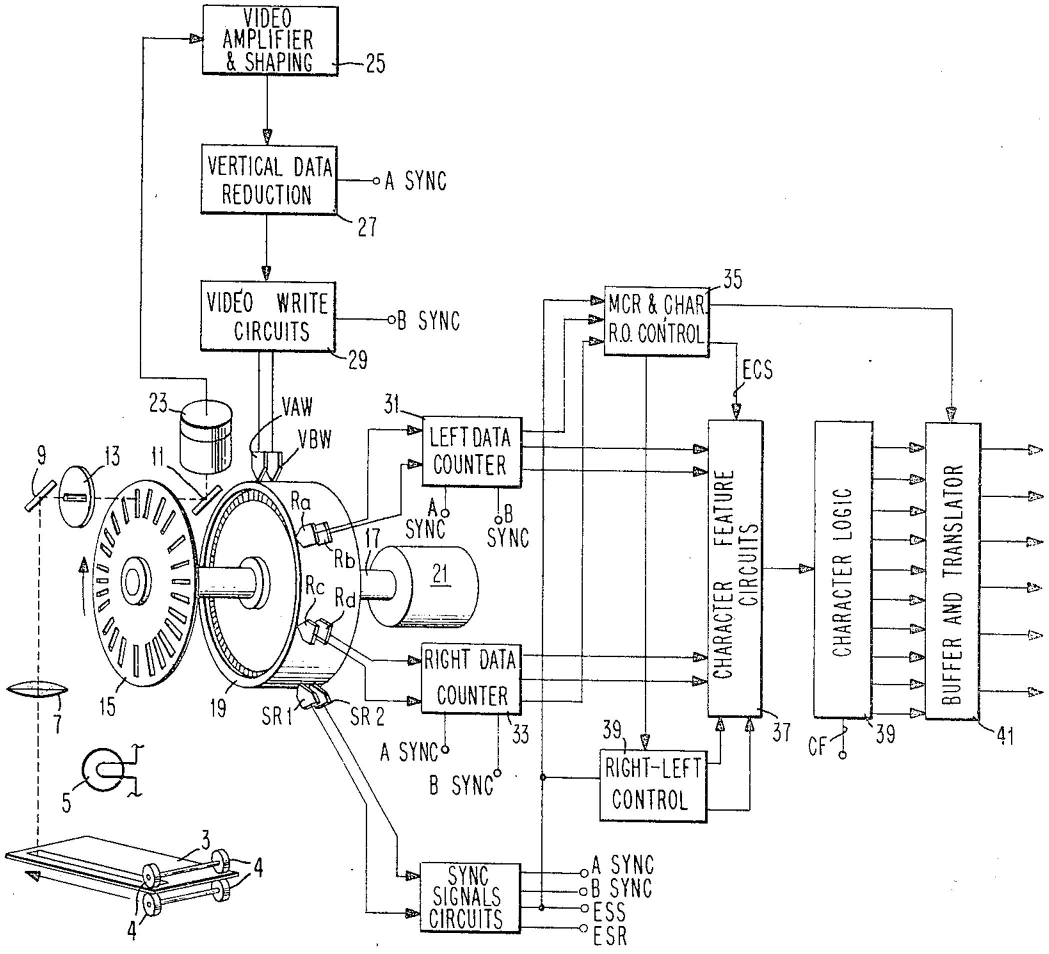
FIG. 1 is a schematic block diagram illustrating the basic principles of a character recognition system embodying the present invention.
Figure 3A:
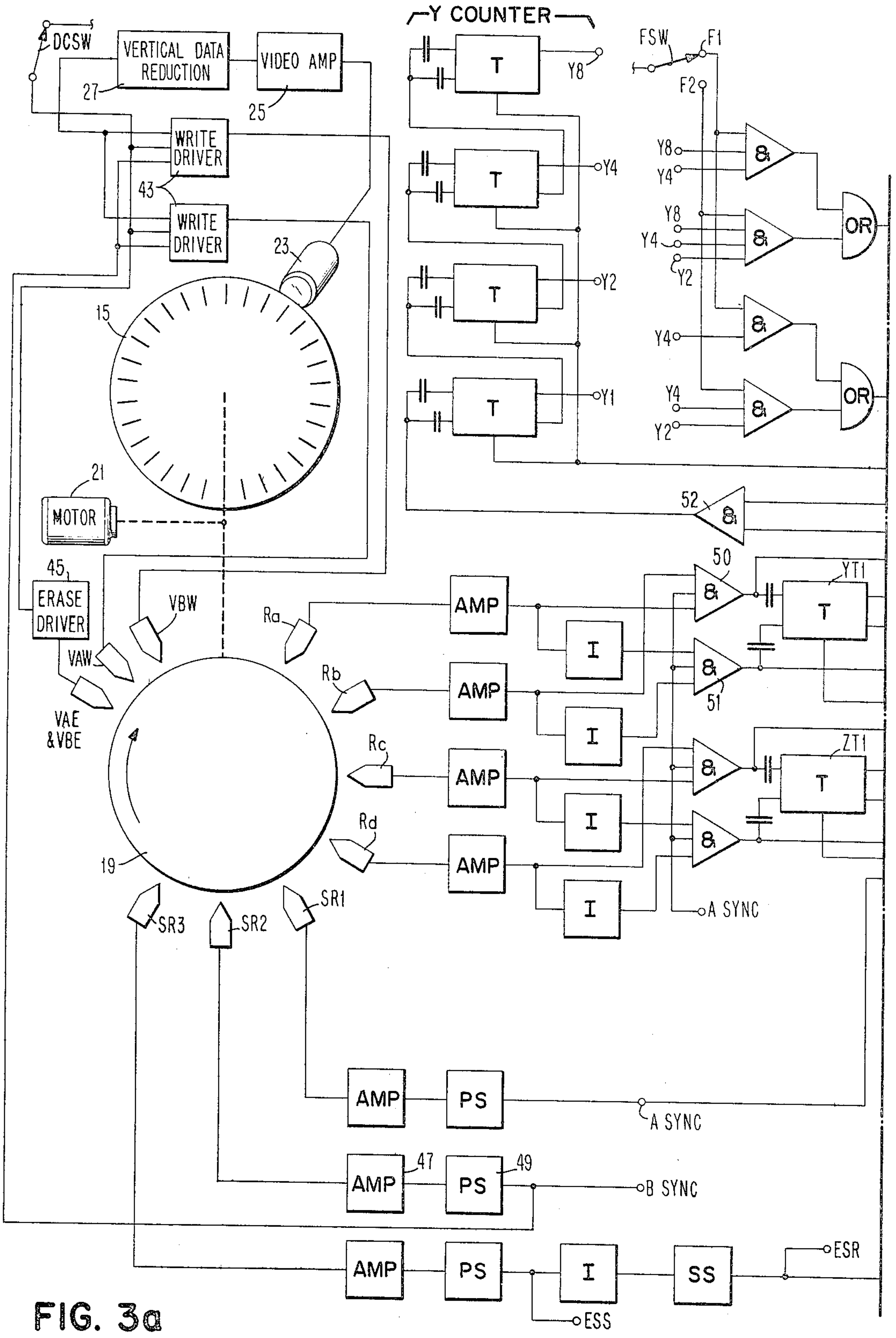
Figure 3B:
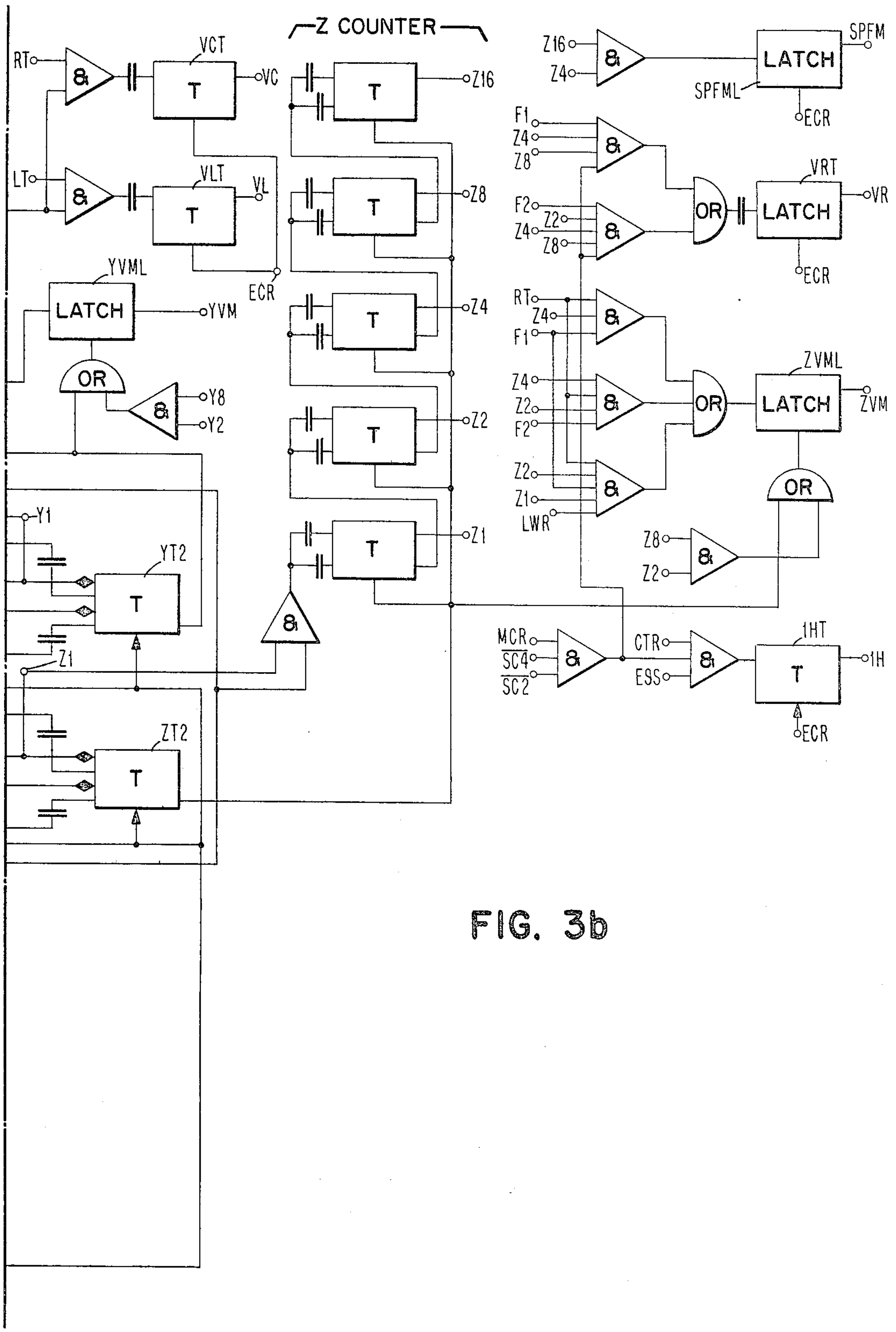

FIGS. 3*a* and 3*b*, taken together, are schematic diagrams which illustrate in detail the major portion of the system shown generally in FIG. 1.

FIGS. 4, 5, 6 and 7 are schematic diagrams of ancillary circuits associated with FIGS. 3*a* and 3*b*.

Similar reference characters refer to similar parts in each of the figures.

Referring now to the drawings, FIG. 1 is a general block diagram which illustrates, in broad schematic form, the essential features of a character recognition system embodying the present invention.

Characters on a document 3 which are to be read by the character recognition system are moved through a sensing station at a uniform rate, by any available document transport means, such as pairs of rotating drive rolls 4. The documents are illuminated by a suitable source of illumination, such as the lamp 5. An electromechanical image dissector or scanning arrangement is provided including a lens 7, mirrors 9 and 11, a stationary slit 13, and a rotating disk 15, having a plurality of radial slots therein arranged in a manner to be specifically described subsequently. The disk 15 is mounted on a shaft 17 which also carries a magnetic drum 19 of the type well known in the data processing art; and the entire assembly is driven by a suitable motor 21. Since the scanning disk 15 and the magnetic drum 19 are solidly affixed to shaft 17, it will be apparent that they will rotate in exact synchronism.

Rotating and stationary slit-type scanners are well known in the character recognition art; and, accordingly, it is believed unnecessary to provide a detailed explanation of the manner in which the parts operate to scan the characters, it being deemed sufficient to point out that the speed of the scanning disk and the motion and spacing of the characters on the document are such that each of the characters to be recognized is scanned by a plurality of vertical scans sequentially following each other and adjacent one another, proceeding, for example, from the bottom of the character to the top. Of course, as is usual, the extent of the scan is greater than the maximum height of the characters to be scanned plus the misalignment tolerance, in order that the characters can be scanned irrespective of where they are located within the vertical misregistration tolerance. The scanning of the characters on the document 3 by the scanning apparatus produces video signals in a photomultiplier tube 23 in accordance with the usual practice in the art, these video signals being amplified by a conventional video amplifier 25, and thereby raised to a suitable amplitude for subsequent handling.

From video amplifier 25 the scanning signals are supplied to a vertical data reduction circuit 27, which operates to reduce the bit frequency without loss of essential data. In the vertical data reduction circuits, the shaped video pulses which are digital in amplitude and variable in width, corresponding to an input signal duration above a clipping level determined in the circuits 25, is supplied to an OR circuit along with the delayed video signal which has been delayed by a time equivalent to the time of one resolution bit. The input to the vertical data reduction circuit and the output from the delay are combined in an OR circuit and are then supplied to the one input of an AND circuit, the other input of which is the sync pulse, designated by the reference A SYNC; the circuit operates in such fashion that the bit frequency, although reduced to one-half of the bit frequency resulting from the scanning operation, still does not cause a loss of information, but does operate at a frequency which is compatible with the magnetic drum circuitry. Obviously, the vertical data reduction circuitry is optional and, depending upon the type of magnetic drum and drum circuitry employed, may or may not be needed.

From the vertical data reduction circuit 27, the digital video data pulses are supplied to video write circuits 29, which also include as an input the synchronizing pulses designated as B SYNC, the write circuits 29 being effective to supply signals which are digitalized in time and representative of the video data obtained by scanning the characters and with sufficient energy to properly be recorded upon a surface of the magnetic drum 19 by the write heads designated by reference characters VAW and VBW, these write heads being spaced peripherally on separate tracks, by a distance equivalent to the time required for one scan through the character.

Spaced along the periphery of the drum in the direction of rotation is a first pair of read heads designated by the characters R*a* and R*b*, which are arranged to read the information recorded in the drum tracks associated with write heads VAW and VBW, respectively. Spaced from the first set of heads R*a* and R*b* is a second set of read heads designated by the reference characters R*c* and R*d*, these heads being spaced from the first set of read heads by a distance equivalent to approximately one-half the character width, so that the signals read off by heads R*a* and R*b* are subsequently read off by heads R*c* and R*d* at a later time equivalent to the time required to move approximately one-half the distance across the characters being scanned. Also, there are a number of sync tracks provided on the drum, each with an associated read head, such as the read head SR1 and SR2, which are arranged to read permanently recorded synchronizing signals from the drum for the purposes of synchronization of the apparatus. The data read from the drum by the read heads R*a* and R*b* is supplied to a left data counter 31, where it is further consolidated to provide an equivalent left scan, referred to as the "Y" scan; and the data read from the drum by read heads R*c* and R*d* is supplied to the right data counter 33, where it is similarly consolidated to provide an equivalent right scan, referred to as the "Z" scan. The consolidated Y and Z scan data from the counters 31 and 33 is supplied to minimum character recognition and character readout control circuits 35, where minimum character requirements (MCR) are determined by some minimum amount of data present in both the equivalent scans; i.e., the Y and Z scans upon entering the character. Only features that are recognized following a minimum character requirement will be retained until the end of the character. A sync signal designated as ECS (End of Character Sample) is supplied from circuits 35 to the character feature circuits designated by the rectangle 37. This end-of-character sample signal ECS occurs when, at the end of a vertical scan, there has been insufficient data present in the Y scan. The latch circuitry in the minimum character requirement circuits is reset at this time and inhibited from being set again until the equivalent Z scan passes through the same void area that determined the end-of-character sample signal ECS. The left data counter 31 includes a binary counter in which the data bits read from the drum are accumulated to determine a vertical minimum count YVM or a long vertical feature, as long as sufficient continuous data is present. The absence of data in the equivalent Y scan for two consecutive sample bit periods or an end-of-scan signal will reset the counter. A similar counter is provided in right data counter 33 to determine vertical minimum ZVM or a long vertical feature in the Z equivalent scan. The vertical location of the vertical minimum counts in the Y or Z scans is determined by a 3-position ring, the positions being referred to as lower, center and upper. The ring is reset at the end of each scan to its lower or initial position and is advanced under the control of data present in the center of the character. If the vertical minimum YVM or ZVM exists prior to advancing the ring to its center position, it is classified as lower. Following the first advance of the ring and prior to the second advance, a YVM or ZVM signal will be classified as center. Following the second advance of the ring and prior to the third advance, a YVM or ZVM will be classified as upper. If a third advance is encountered, an indication of three horizontal crosses (3H) feature is indicated to the character feature circuits. An alternate condition may be provided for the advance of lower to center by the detection of the horizontal portion using data from both the Y and Z equivalent scans.

The horizontal location of the vertical features is accomplished by determining the right and left sides of a character by means of right and left control circuits 39. The right side of the character may be considered as data that is present in the Z equivalent scan within the first several individual scans following the detection of minimum character requirement. The center of the character may be classified as the data existing in the Y equivalent scan during the scanning of the right side of a character, and the left side may be considered as data that is present in the Y equivalent scan within several scans prior to the determination of the end-of-character sample signal. Such information is provided by the use of a scan counting circuit in connection with the right/left controls, arranged so that, after minimum character requirements are satisfied, the scans are counted and limits set up which designate whether or not the right, left or the center of the scan is being examined. In the system disclosed, the circuits cooperate to effectively divide the character area into an imaginary 3-element-by-3-element rectangular matrix; and the presence of or absence of predetermined numbers of character data bits in selected ones of the matrix locations, together with the presence or absence of elements in others of the matrix locations, are combined to provide an indication of the character scanned. This operation is carried out by action of the character feature circuits, which include a plurality of triggers or other bistable devices which are operated in accordance with the presence or absence of data at the various locations in the matrix and depending upon the amount of data so located. After the character has been scanned as designated by an end-of-character sample signal, the feature information, which has been stored in the character feature circuits, is read out to character logic 39, which consists of a plurality of combinatorial logic circuits, arranged to decode the character feature information to indicate the character scanned. The logic may also include means for indicating the failure to recognize a character by an output on the line designated as CF. The outputs of the character logic indicative of the character scanned are stored in character latches, the outputs of which may be supplied further to buffer and translator circuits 41, from whence it is supplied to any suitable utilization device, for example, a card punch.

The foregoing describes generally the organization of a character recognition system embodying the present invention wherein an electromechanical scanner is employed and a magnetic drum is used as a delay device for providing delayed scanning information for purposes of feature analysis. Also, it has been pointed out that left and right equivalent scans are generated in the data therein as examined to determine the presence or absence of selected features which, at the end of scanning, are examined by suitable logic circuits to determine the character scanned.

Figure 2:
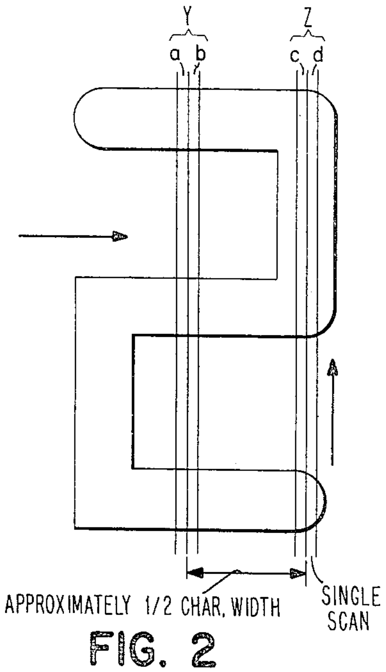
FIG. 2 is an illustration of the effective scanning pattern employed in the present invention.

Referring now to FIG. 2, there is shown to an enlarged scale a schematic illustration of the relationship of the equivalent scans, with respect to a character. It can be seen from an inspection of FIG. 2 that the Y and Z equivalent scans are made up of adjacent scans *a*, *b*; and *c*, *d*. Each of these consist of a single scan, and the two pairs of scans comprising the Y and Z equivalent scans are spaced apart by approximately one-half character width. In the embodiment illustrated herein, the scanning takes place from the bottom to the top of the characters, while the characters move in a direction from right to left.

An exemplary list of different features that may be detected by considering the pressence or absence of character data information in different locations within the imaginary scanning matrix into which the character is divided by the subject invention is as follows:

| | |
|---|---|
| LR—Lower Right | VR—Vertical Right (Long) |
| CR—Center Right | VC—Vertical Center (Long) |
| UR—Upper Right | VL—Vertical Left (Long) |
| LC—Lower Center | 3H—Three Horizontals |
| LL—Lower Left | 1H—Single Horizontal |
| CL—Center Left | ORC—Open Right Center |
| UL—Upper Left | |

As any one of these features is detected during the scanning operation, it is stored in a feature latch; and, at the end-of-character sample time, the outputs of the latches are sampled and provided to suitable combinatorial logic circuits which determine whether or not a particular character has been scanned in accordance with the features that have been stored. As an example, the character "5" may be identified by the presence of the following character features: CR, UL and 3H. In addition to the presence of these features, the following features must be identified by their absence: UR, LC, LL, CL, ORC, VR, VC and 1H. It is apparent from the foregoing that the identification of the characters from the character features is dependent, not only on the presence of character features at predetermined positions within the coordinates obtained by the use of the present system, but also on the absence of features located otherwise within the recognition matrix.

It will be apparent to those skilled in the art that more or fewer character features may be employed depending on the type and number of characters to be recognized, it being obvious that fewer features are required to detect simple stylized numeric fonts than would be necessary to recognize alphabetic characters as well as numeric characters, or non-stylized fonts.

Having thus described a general embodiment of the invention, attention will now be given to the details of the arrangement shown in FIGS. 3*a* and 3*b* taken together, which, considered with the circuits shown in FIGS. 4, 5, 6 and 7, constitute the details of a particular embodiment of the invention.

In FIG. 3*a*, the schematic layout of the scanning disk 15 and magnetic drum 19, both mechanically connected to motor 21, is illustrated, together with the placement of the plurality of magnetic heads around the periphery of the drum. As described previously in connection with FIG. 1, the scanning signals are generated by photomultiplier 23, amplified by video amplifier 25, passed through the vertical data reduction circuits 27, and thence to a pair of write drivers 43. The write drivers supply write signals to the two write heads VAW and VBW, indicated in FIG. 3*a*, spaced apart by one scan length as previously described.

A pair of erase heads VAE and VBE are provided just ahead of the write heads VAW and VBW. The write driver circuits and the circuit for an erase driver 45 are normally "on," as controlled by a diagnostic control switch DCSW, so that the erase heads are continuously clearing the video tracks just prior to writing. The erase driver 45 and the write drivers 43 may be turned off by diagnostic control switch DCSW so that the video data that is recorded on the video tracks by the write heads VAW and VBW is retained on the drum. This recorded fixed data pattern may now be used as a diagnostic entry for system troubleshooting.

Synchronization of the writing of the signals on the drum is provided by B sync signals supplied to the write drivers 43 from the B sync signal generating circuits, which include the head SR2, an amplifier 47 and a pulse shaper 49, the permanently recorded sync signals being provided on a suitable track on drum 19, so that, as they are read, appropriately shaped signals are supplied at predetermined intervals to the B sync terminal. Heads SR1 and SR3, in addition to SR2, are also used to provide sync signals at various times for the operation of the apparatus. In each case, the signals read from the drum are passed through suitable amplifier and pulse shaping circuits. Head SR1 provides the A sync signals, while head SR3 provides signals which are coordinated with the scanning slits in such a way that they indicate the end-of-scan sample signal ESS. The end-of-scan sample pulse ESS is also supplied through an inverter and a single shot to provide a delayed signal designated ESR for end-of-scan reset.

Certain other synchronizing signals are provided by other circuitry which will be subsequently described.

The apparatus associated with generating the left-hand equivalent or Y scan and the right-hand equivalent or Z scan is similar, as can be seen from an inspection of the drawings. The read heads, such as R*a*, R*b*, R*c* and R*d*, each supply their signals through conventional read amplifiers, where the signals are amplified and properly shaped, and are then supplied to logic circuits and triggers which generate the Y and Z scans.

The triggers YT1 and YT2, together with the Y counter, form the left data counter 31 previously described in connection with FIG. 1. This counter represents the Y scan as shown in FIG. 2. The Y scan looks for character data when reading the left side of the character and controls the matrix when it is scanning the right data.

A count of bits is made for each vertical equivalent scan. The longer the stroke is, the greater the bit count will be. As the counter reaches certain values, latches will be set to indicate the length of the stroke indicated by the number of counts. These latches, along with the data counter, are used to set feature triggers and to control the shifting of the matrix.

The Y scan circuitry consists of the two read heads R*a* and R*b*, the signals of which are supplied through conventional video amplifiers and thence to the two inputs of an AND circuit 50, along with A sync signals. It will be apparent that both heads must be reading data before an output is obtained from AND circuit 50. Thus, counts are obtained only after data is being read into both the *a* and *b* single scans and the Y equivalent scan. The first time that heads R*a* and R*b* read bits simultaneously, trigger YT1 is turned on by the output of AND circuit 50. The second simultaneous bit reading by heads R*a* and R*b* will then turn on trigger YT2. When trigger YT2 turns on, a reset signal is removed from a line which goes to the reset circuitry of a 4-stage binary counter ring indicated as Y counter, which is connected in conventional binary fashion to count the number of inputs thereto.

Once turned on, triggers YT1 and YT2 remain on as long as either head R*a* or R*b* is detecting character data. The first time that an A sync pulse occurs when neither head R*a* or R*b* are reading character bits, an AND circuit 51 is enabled to cause trigger YT1 to turn off, and a second coincident failure to read data will cause trigger YT2 to turn off. The Y counter is driven by A sync pulses under the control of trigger YT1, through the use of AND circuit 52. The counter is reset by trigger YT2 being set off. With triggers YT1 and YT2 both on, the Y counter begins advancing with each A sync pulse, the counters effectively counting the number of black bits being read by both *a* and *b* scans. Counting will continue until both the *a* and *b* scans fail to read bits. When trigger YT2 is turns off, the counter is reset to zero. Since the counter is arranged in ordinary binary fashion, the output terminals are designated by the binary count which a particular stage provides; e.g., Y1, Y2, Y4 and Y8, thereby providing a potential possible count of 15.

The purpose of counting bits during an equivalent scan is to determine the length of the vertical character stroke; and, as the Y counter advances, it indicates the length of the character stroke by the number of counts accumulated therein. Obviously, the number of counts employed and the size and type of counters can be varied to suit the characters being read.

Since it is possible that it may be desired to recognize the characters belonging to different type fonts, the vertical features of which would be different, FIG. 3 illustrates the manner in which a portion of the feature detection circuits may be arranged to accommodate characters belonging to different fonts. A font selection switch FSW is arranged to provide an output F1 or F2 depending on the positioning of the switch. This switch selectively energizes one or the other of sets of AND circuits which are utilized to combine the outputs of the Y counter, in order to detect particular vertical features. Thus, for example, a latch YVML will be energized upon a count of either "4" or "6" depending upon whether the switch FSW is providing an output F1 or F2, respectively. That is to say, if the output F1 is active, then the output Y4 of the Y counter will provide an output through the OR circuit shown to the input of latch YVML to set this latch on, indicating a minimum vertical stroke in the Y equivalent scan. On the other hand, if the switch FSW is set to provide an output F2, then an AND circuit is enabled which includes, as its inputs, the output of Y counter stages Y4 and Y2, both of which will be on only after a count of six, so that, in this case, a count of six is required to indicate a vertical feature YVM. The output of latch YVML is designated as YVM. This latch is reset by the counter trigger YT2 being turned off or by a count of "10" as indicated by inputs of Y8 and Y2 to an AND circuit associated with the latch reset. Additionally, two features designated as VC and VL are provided by supplying outputs from the Y counter through AND circuits which are selectively energized for different counts in accordance with the font to be recognized. The outputs are supplied through an OR circuit to a pair of selection gates, the other inputs of which are designated as RT and LT, indicating right and left counts of the scan counter to be later described. If the RT line is energized at the time the Y counter reaches a predetermined count, then trigger VCT will be set on to provide an output VC. On the other hand, if at the time a particular count is reached in the Y counter as determined by the setting of the switch FSW and the subsequent logic circuits, the signal LT is present, then trigger VLT will be set on and provide an output VL. Both of these features, designated as vertical center and vertical left, will be utilized in determining the character scanned by the recognition circuitry to be later described. The triggers VCT and VLT are turned off by an end-of-character reset pulse to be generated by circuits later described.

From the foregoing, it will be apparent that, during a Y equivalent scan, any time that the two scans *a* and *b*, making up the equivalent scan, are both reading black character data, the Y counter will be counting to reach a count which is proportional to the length of the black portion of the character which the scans intercept. The counter is reset each time the scans both fail to read black. Accordingly, the Y counter will provide output indications indicative of the length of the black portion of the character seen during the particular Y equivalent scan. Examination of the drawings will clearly indicate that the circuitry provided in connection with the Z equivalent scan, comprising the reading heads R*c* and R*d*, the triggers ZT1 and ZT2, and the Z counter, are essentially the same as that described above in connection with the Y scan and Y counter. The only particular difference of note is that the Z counter comprises five stages of binary coupled triggers as compared with the four used in the Y counter. The reason for using an extra counter stage in the Z counter is to permit the total count of twenty to be accommodated, which may be utilized to indicate an extra long mark designated as a special field mark, a count of twenty turning on a latch SPFL to provide an output SPFM.

Other character features which are recognized by the use of counts accumulated in the Z counter are the vertical right feature, indicated by the setting of a trigger VRT, which is set by a count of twelve in the Z counter for the F1 font, or a count of fourteen for the F2 font, as can be seen by an inspection of the AND circuits which are connected to the input of trigger VRT. Latch ZVML provides an output ZVM in accordance with input signals supplied to the latch via combinatorial logic circuits, which combine particular counts in the Z counter with a selection in accordance with whether font F1 or F2 is being read, and further in accordance with whether or not the right side of the character is being scanned as a signal supplied at terminal RT, by a circuit to be described later, and also by a signal indicating that the lower part of the character is being scanned, designated by the reference character LWR, and generated by a circuit to be later described. On the fulfillment of any of the selected conditions, as determined by this logic, latch ZVML is set, to provide the output signal ZVM. The Z counter and the ZVML latch are reset by the resetting of trigger ZT2. Latch ZVML is also reset by a count of ten occurring in the Z counter as determined by the input from Z8 and Z2 to the AND circuit associated with the reset circuit for latch ZVML.

Another character feature, 1H, indicating the presence of one horizontal element is indicated by the setting of a trigger 1HT. The trigger 1HT, when set on, provides an output 1H indicative of one horizontal feature; and the trigger is reset by the end-of-character reset pulse appearing at terminal ECR. The conditions for obtaining the 1H feature signal include the presence of a signal CTR from the counter circuit, to be later described, indicating the center of the character, an end-of-scan sample pulse ESS, a minimum character requirement signal MCR, generated in a manner to be subsequently described, and the absence of a count of "4" or "2" in the scan counter circuit to be subsequently described. When each of these conditions is met, an indication is provided that a single horizontal feature is present; and the output 1H will be energized. The presence of the MCR signal and no "4" or "2" count in the scan counter is also utilized to govern the inputs to the trigger VRT, described above, which provides the output signal VR, indicating the presence of a vertical right feature.

Figure 4:
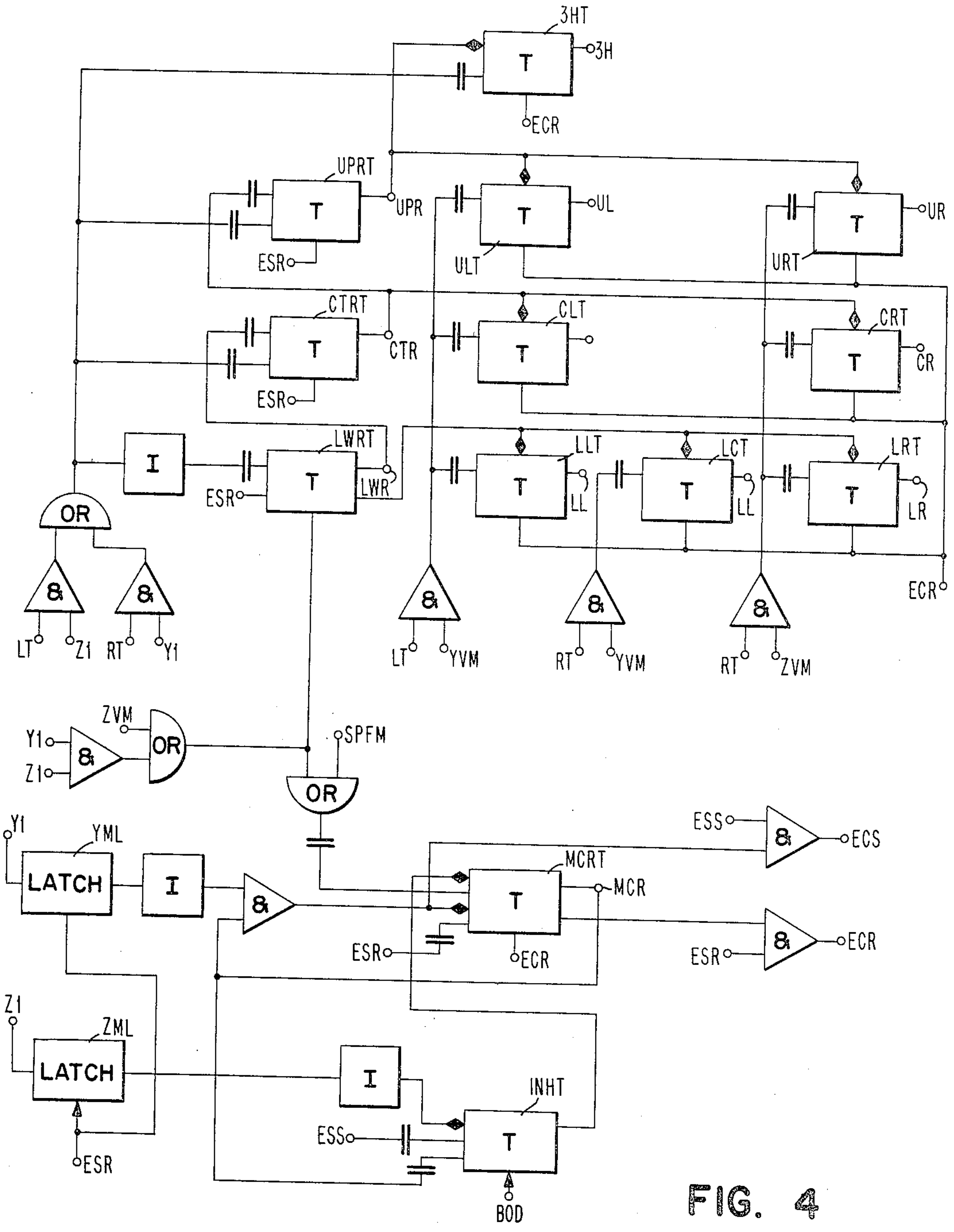

Referring now to FIG. 4, there are shown the minimum character requirement circuitry and the ring-controlled trigger matrix which determines the location of certain character features. The minimum character requirement and character readout circuitry includes a minimum character requirement trigger MCRT, and an inhibit trigger INHT, which cooperate to provide the signals ECS, indicating end-of-character sample, and ECR, indicating end-of-character reset, when supplied through the AND circuits shown in FIG. 4 that include as inputs the synchronizing signals ESS and ESR. The MCR circuits indicate the beginning and end of a character; and, although the scanning operation is continuous, no character features are saved until minimum character requirements are satisfied. Also, the scan counter is not operative until the minimum character trigger has been set. The essential purpose of the MCR circuitry is to turn on the trigger MCRT when the right-hand edge of the character begins to pass under the Z scan read heads. Since the area immediately to the right of the character must be void of any black data, this fact is used in determining the MCR requirements and, when sensed by the Z scan, the inhibit trigger is turned on. The inhibit trigger is normally reset by a signal BOD, which is a signal supplied by circuitry not shown that indicates the beginning of a document to be scanned.

When trigger Z1 turns on, latch ZML is turned on and, since scanning is continuous, ESS and ESR pulses are present after each scan. ZML is reset off with each ESR signal. If no Z data is read during the next scan, Z1 remains off and ZML is not set. Therefore, at ESS time, with ZML off, the inverter supplies a gate signal to the on side of the inhibit trigger INHT and the ESS signal supplied through the AC set-on line will turn on the inhibit trigger. Once this trigger is turned on, it remains on until an output from MCR trigger MCRT or a BOD signal resets it. The turning on of trigger INHT provides a DC gate signal to the on side of trigger MCRT, and thereafter the AC set-on line can be energized either by an SPFM signal, a ZVM signal, or the presence of both Y1 and Z1 signals, as shown by the logic connected to the AC set-on line of trigger MCRT.

When trigger MCRT is turned on, the output MCR is supplied to the AC set-off line of trigger INHT, which is then turned off. Trigger MCRT is turned off by the ESR signal, providing that it has been previously turned on, and the YML latch is not set, thereby indicating that the left-hand end of the character has been scanned.

After a minimum character requirement MCR has been established and the features are being detected and stored by the feature triggers, it is necessary to determine when to test the features to establish the identity of the character which has been scanned. Feature retention begins when the right-hand portion of the character passes under the Z scan, as seen in FIG. 2. As pointed out above, this is signified by the MCR trigger MCRT being turned on. The turning on of trigger MCRT enables the scan counter, to be later described, to count. Also, data in the right-hand portion of the matrix is counted by the Z counter. This Z data is accumulated in less than five scans or before the Y scan reaches the left-hand character stroke. When the left-hand character stroke begins passing under the Y scan, the Y data is counted by the Y counter and the features relating to the left side of the character are developed. After having stored both right and left features, the character is ready for readout from the feature triggers and translation by the logic circuitry. To do this, a sampling signal, designated as ECS for end-of-character sample, is generated and tests the feature triggers as soon as a void is recognized by the Y scan to indicate that the character has entirely passed beyond the Y scan. The circuits that govern the end-of-character sample signal are referred to as the character readout control circuits. The end-of-character sample signal requires the coincidence of the end-of-scan sample signal generated by the synchronizing circuits and a second input which indicates that the MCR trigger MCRT is on, and that the YML latch is off. Thus, the end-of-character sample time occurs at the end-of-scan sample time of the first scan in which no YM is obtained to turn on the YML latch; and, in addition, the MCR trigger MCRT must be on. The requirements for turning the MCRT trigger on, of course, include the presence of a ZVM signal, which insures that extraneous black marks will not be indicated as character strokes. The end-of-character sample signal is used to energize the combinatorial logic circuits which have as their inputs the outputs of various feature triggers, so that the contents of these triggers are sampled only at an appropriate time after the features have been saved and it has been determined that the entire character has been scanned. The same signal developed to enable the AND gate associated with the ECS signal is also used to condition the trigger MCRT for turnoff upon the occasion of the next ESR, or end-of-scan reset, pulse; and, when this pulse occurs, the trigger MCRT is reset and thereby enables an AND circuit to provide an output upon the occurrence of the end-of-scan reset signal ESR, the output of this AND circuit being designated as ECR for end-of-character reset, which signal is used for resetting the feature latches.

Figure 5:
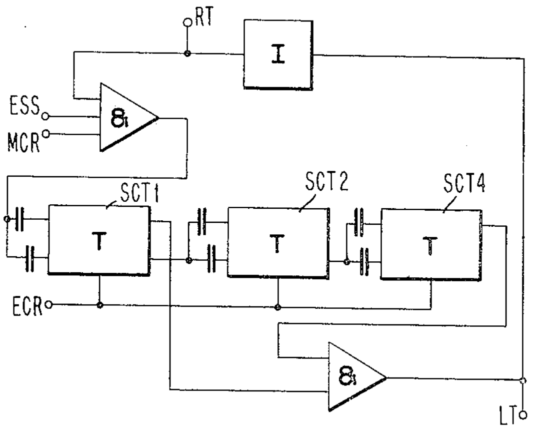

Before describing certain of the matrix triggers, the operation of the scan counter which is utilized to determine whether or not the left or right side of the character is being scanned will be described. This arrangement is shown in FIG. 5 of the drawings and comprises a 3-stage binary counter utilizing three cascade-connected figures, designated as SCT1, SCT2 and SCT4. These triggers are set to their off condition by the ECR pulse; and, in such case, since there is no output from trigger SCT1 or SCT4, there is no output from the AND circuit supplied from the on side of these two stages; and, accordingly, there is no LT signal present. However, the absence of the LT signal, by virtue of the inverter shown, causes an RT signal to be supplied with the scan counters in their reset condition. Thus, normally the circuit indicates that the right side of the character should be considered, as would be the case. Upon the occurrence of an MCR signal and at ESS time, the AND circuit, which also includes an RT input, will be enabled to supply ESS signals at the end of scan sample time to the counter stages. It is apparent that no change will take place until the fifth scan occurs, at which time an output from the counter stages SCT1 and SCT4 will enable the AND circuit and thereby provide a left LT signal. The presence of signal LT will cause the inverter to discontinue the signal RT, which in turn disables the AND circuit in the input to the counter stages, so that the counter effectively stops on the count five and thereafter indicates that an LT signal is present. Thus, the characters are divided into a right and a left portion in accordance with whether the scans are less than five or greater than five in number. It should be noted that the invention is not limited to the use of any particular number of scans, and it may also be noted the counter can be arranged in such manner that scans less than a predetermined number will indicate the right side of the character, an intermediate count or several counts can be used to designate the center, and a count greater than the intermediate counts can be used to indicate the left side.

Referring again to FIG. 4, for the purpose of dividing the character features into lower, center and upper portions, a chain of three triggers, designated as LWRT, CTRT and UPRT, respectively, are provided, which provide output signals DWR, CTR and UPR, respectively, indicating the lower, center and upper portions of the character area. These triggers are normally conditioned so that the trigger LWRT is set on, and it is set to its off position by the combination either of a signal LT and Z1 or a signal RT and Y1, indicating whether or not the left or right side of the character is controlling the scanning. When either of these two combinations appears, the output signal is inverted and supplied through the trigger LWRT, which results in the trigger being set off upon the first occurrence of a ZVM signal, or the combination of a Y1 or Z1 signal. With the lower trigger on, an input causes a shift to thereby cause the center trigger CTRT to turn on and the lower trigger is thereafter turned off, while the next shift will turn on the upper trigger UPRT and turn off the center trigger. Still a third shift in the inputs will turn off the upper trigger. An ESR pulse resets the upper or center triggers off and turns the lower trigger on after each scan.

The outputs from the lower, center and upper triggers are fed to buses which supply the gate signals for the rows of a matrix of triggers, the AC set-on signals being supplied by columnar connections from AND circuits which indicate whether the left or right side data is to be supplied to set the triggers on. These triggers, as shown in FIG. 4, are ULT, CLT, LLT, LCT, LRT, CRT and URT, respectively supplying output signals designated as UL, CL, LL, LC, LR, CR and UR. The LLT, CLT and ULT triggers are supplied with a set-on pulse from an AND circuit having inputs LT and YVM, to provide a signal indicating a character feature in the lower left, center left or upper left areas; the trigger LCT is turned on by a signal supplied from an AND circuit having the inputs RT and YVM, indicating a signal in the lower center of the character; and the triggers LRT, CRT and URT are provided with set-on signals from an AND circuit having inputs RT and ZVM, indicative of the presence of character features in their respective lower, center and upper portions of the right-hand side of the character. Another feature trigger is 3HT, which has as its gate input a signal from trigger UPRT, and is set on by the shift pulse which operates the lower, center and upper triggers. This trigger is effective to provide an output signal only when three horizontal character features have been detected, this output being designated by the reference character 3H.

Figure 6:
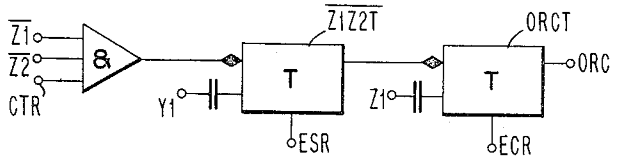

Another feature which is sometimes useful for distinguishing between characters is designated as open right center, and the circuit for developing this feature signal is shown in FIG. 6. The absence of signals Z1 and Z2, plus the center trigger CTRT being set on, supply the necessary inputs to an AND circuit which provides a gate signal for a trigger designated as $\overline{Z1Z2}$T, which trigger is set on by the first Y1 signal following the enabling of the input gate. With $\overline{Z1Z2}$T turned on, the open right center trigger ORCT is enabled by the output of $\overline{Z1Z2}$T; and, when the signal Z1 is present, the trigger ORCT is set on to provide an output designated ORC, indicating an open right center of the character. Trigger $\overline{Z1Z2}$T is reset by the end-of-scan reset pulse, and trigger ORCT is reset by the end-of-character reset pulse.

Figure 7:
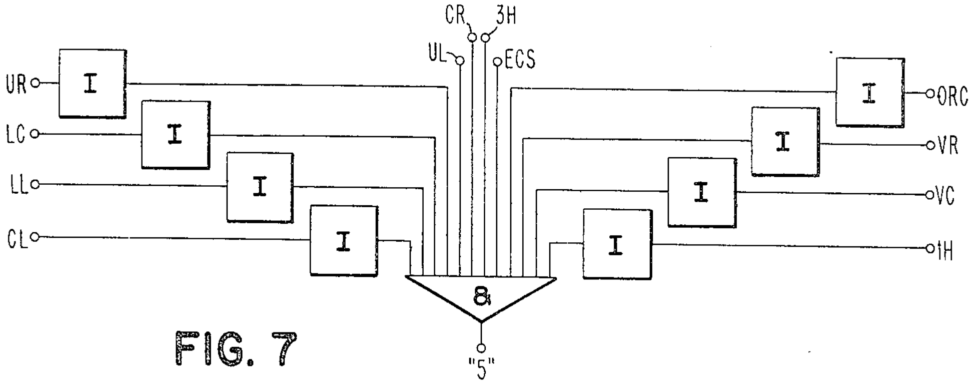

Having thus described the manner in which the character features are determined in accordance with the position within an imaginary matrix dividing the character into horizontal and vertical portions, it will now be shown how these character features may be combined to provide an indication of the character which was scanned. One example of the manner in which this may be carried out is illustrated in FIG. 7. FIG. 7 is an example of the type of logic which would be employed to indicate the character "5" had been scanned by combining the presence and absence of character features. As shown, a multi-input AND circuit, having an output designated as "5," has inputs supplied thereto corresponding to the signals UL, CR and 3H, indicating the presence of these character features; namely, upper left, center right and three horizontal cross-overs. Also, an output from the AND circuit is obtained only when the signal ECS (end-of-character sample) is supplied thereto. In addition to these positive feature presence signals, it is necessary to also consider the absence of eight other features; namely, UR, LC, LL, CL, ORC, VR, VC and 1H, these signals being inverted and supplied to the AND circuit. When all of the predetermined features are present or absent, as the case may be, as indicated by the logic circuit, the occurrence of an end-of-character sample signal will provide a readout indicating that a character "5" has been scanned. It will be apparent to those skilled in the art that the remainder of the character logic circuits would be arranged in similar fashion. Also, it should be noted that, although for purposes of illustration, the outputs from the triggers have been shown inverted in FIG. 7 to provide an absence detection, it is apparent that the off side of the particular trigger could be used rather than to invert the signal from the on side of the triggers or latches.

From all of the foregoing, it will be apparent that the present invention provides a unique and economical character recognition system in which the characters are scanned and the scanning signals are delayed by a suitable amount to provide equivalent scans which are spaced apart by aproximately one-half the character width. These equivalent scan signals are utilized to control the inputs of character data which will set triggers arranged in a matrix fashion to indicate the presence or absence of character data in predetermined positions in an imaginary matrix which is provided by dividing the area occupied by a the character into horizontal and vertical zones.

While the invention has been particularly shown and described with reference to a preferred embodiment thereof, it will be understood by those skilled in the art that the foreging and other changes in form and details may be made therein without departing from the spirit and scope of the invention.

What is claimed is:

1. A character recognition system comprising, in combination, (a) scanning means for sequentially scanning characters to be recognized with a plurality of serial scans progressing across each of the characters and generating character data signals in response to the scanning of portions of the characters, (b) serial storage means connected to and synchronized with said scanning means for storing said character data signals in the order in which they were generated, (c) data reading means for reading said character data signals from said serial storage means at a plurality of predetermined time intervals following the recording of said signals, (d) first data analyzing means connected to said data reading means for analyzing data contained in a first pair of adjacent scans to provide first equivalent scan signals only when data is present in both of said first pair of adjacent scans, (e) second data analyzing means connected to said data reading means for analyzing data contained in a second pair of adjacent scans to provide second equivalent scan signals only when data is present in both of said second pair of adjacent scans, said second pair of scans being spaced substantially one-half character width from the first pair of said scans, (f) minimum character requirement detection circuits connected to said first and said second data analyzing means and effective to provide a minimum character requirement output signal in response to predetermined equivalent scan signals provided by data analyzing means, (g) scan counting means connected to said scanning means and to said minimum character requirement detection circuits for counting the scans occurring after the start of scanning a character and providing scan count signals indicative of a plurality of arbitrary horizontal divisions of a character, (h) feature recognition means connected to said first and said second data analyzing means and to said scan counting means for developing feature signals in response to data present in said equivalent scans for each of said horizontal divisions of a character, and (i) character logic means connected to said feature recognition means for providing an output indicative of the character scanned.

2. A character recognition system as claimed in claim 1 in which said scanning means and said storage means comprise a rotating disk scanner and a magnetic storage drum rotated in synchronism.

3. A character recognition system as claimed in claim 1 in which said first and said second data analyzing means each include a counter for counting character data read from said storage means.

4. A character recognition system as claimed in claim 3 in which each of said data analyzing means includes means for selectively determining the number of counts achieved by said counters in accordance with the font to be recognized.

References Cited

UNITED STATES PATENTS

| | | | |
|---|---|---|---|
| 2,894,247 | 7/1959 | Relis | 340—146.3 |
| 2,897,481 | 7/1959 | Shepherd | 340—146.3 |
| 3,008,123 | 11/1961 | Rohland | 340—146.3 |
| 3,072,886 | 1/1963 | Greanias et al. | 340—146.3 |

MAYNARD R. WILBUR, Primary Examiner

R. F. GNUSE, Assistant Examiner